United States Patent [19]
Hsu et al.

[11] Patent Number: 5,447,425
[45] Date of Patent: Sep. 5, 1995

[54] INJECTION MOLDING ASSEMBLY FOR FORMING FOAM PRODUCTS

[75] Inventors: Yao-Tung Hsu, Pan-Chiao; Jen-Sheng Ho, Chu-Pei; Wu-Po Chiang, Tao-Yuan Hsian; Woei H. Wu, Taichung, all of Taiwan

[73] Assignee: Leopardex Industrial Co., Ltd., Tao-Yuan Hsien, Taiwan

[21] Appl. No.: 288,257

[22] Filed: Aug. 11, 1994

[51] Int. Cl.⁶ .......................................... B29C 45/77
[52] U.S. Cl. ................... 425/149; 264/40.7; 264/328.11; 425/150; 425/551; 425/562; 425/574; 425/593
[58] Field of Search .............. 425/149, 150, 557, 561, 425/562, 574, 593; 264/40.3, 40.4, 328.11, 40.7

[56] References Cited
U.S. PATENT DOCUMENTS

| | | | |
|---|---|---|---|
| 4,758,391 | 7/1988 | Shimizu et al. | 425/149 |
| 5,352,394 | 10/1994 | Fujita et al. | 425/149 |

FOREIGN PATENT DOCUMENTS

| | | | |
|---|---|---|---|
| 2130117 | 5/1990 | Japan | 425/149 |

*Primary Examiner*—Tim Heitbrink
*Attorney, Agent, or Firm*—Fitzpatrick, Cella, Harper & Scinto

[57] ABSTRACT

An injection molding assembly includes an automatic control unit that activates a machine moving mechanism to move an injection molding machine toward a mold unit and further activates the injection molding machine to inject molten foamable material into a mold cavity of the mold unit until the pressure inside the mold cavity reaches a first predetermined value to indicate that a predetermined amount of the molten foamable material has been fed thereto. The control unit activates the machine moving mechanism to move the injection molding machine away from the mold unit and further activates a mold opening mechanism so as to open the mold unit when the pressure inside the mold cavity reaches a second predetermined value to indicate that foaming of the molten foamable material in the mold cavity has been completed.

3 Claims, 7 Drawing Sheets

INJECTION MOLDING ASSEMBLY FOR FORMING FOAM PRODUCTS

BACKGROUND OF THE INVENTION

1. Field of the Invention

The invention relates to an injection molding assembly for foam products, more particularly to a fully automatic injection molding assembly which can control automatically the amount of foamable material to be injected into a mold unit and which can control automatically the opening of the mold unit.

2. Description of the Related Art

Presently, conventional chemical foam forming techniques require a direct compression molding step or the injection of foamable material into a compression mold to form foam products. These foam forming techniques cannot be accomplished at a fast pace because they require the presence of human operators, thereby preventing an increase in the production capacity to prevent correspondingly a decrease in the manufacturing costs. Furthermore, a large amount of scrap is produced when these techniques are performed.

Figure 1:
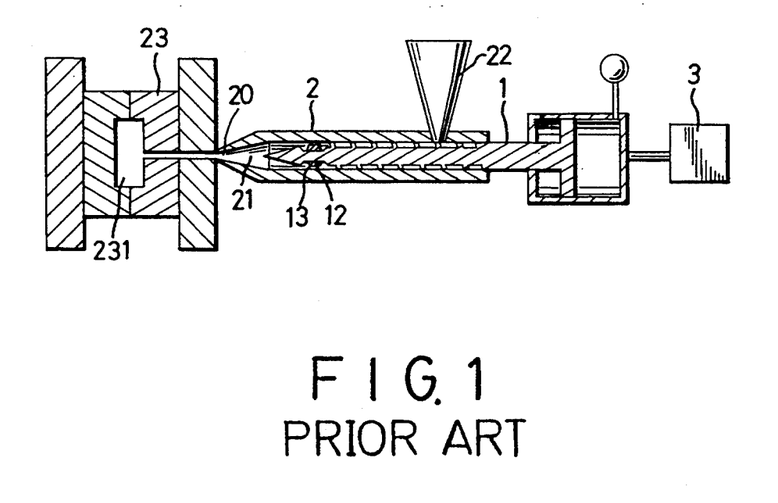
FIG. 1 is a schematic view of a conventional injection molding assembly.

FIG. 1 is a schematic view of a conventional injection molding assembly. In this figure, raw foamable material is fed into an injection cylinder 2 of an injection molding machine by means of a material hopper 22. A reciprocating screw 1 extends rotatably into the injection cylinder 2 and has an outer surface which is provided with heating elements (not shown). The reciprocating screw 1 is responsible for heating and homogenizing the foamable material in the injection cylinder 2 and for controlling the flow of the foamable material in the latter. When an injection chamber 21 located at a front end of the injection cylinder 2 already contains a predetermined amount of molten foamable material, a hydraulic cylinder 3 forces the reciprocating screw 1 toward a nozzle 20 of the injection cylinder 2, thereby forcing the molten foamable material in the injection chamber 21 into a mold cavity 231 of a mold unit 23. In order to prevent reverse flow of molten foamable material in the injection chamber 21, a nonreturn flow valve assembly 12 is installed on a front end of the reciprocating screw 1. When the reciprocating screw 1 rotates, the molten foamable material flows into the injection chamber 21 via a clearance 13 defined cooperatively by the valve assembly 12 and the internal wall surface of the injection cylinder 2.

Use of the conventional injection molding assembly requires precise control of the injecting pressure, the amount of molten foamable material to be injected, and the room and mold temperatures in order to obtain high quality foam products. Defective foam products are produced if any of these factors cannot be controlled.

In the conventional injection molding assembly, the values of the injecting pressure, the amount of molten foamable material to be injected and the mold temperature are determined in accordance with the operator's experience or by conducting repeated experimentation until the best quality product is produced. Thus, setting of these values cannot be accomplished quickly. Furthermore, after the injection molding assembly has been in use for a long time, changes in the operating conditions often results in changes in the heat dissipating and heat collecting properties of the mold unit, thereby making precise control of the mold temperature difficult to accomplish. This can affect the stability of the foam products. In addition, the evenness and smoothness of the foam products are affected if the amount of molten foamable material that is injected into the mold cavity cannot be controlled precisely.

SUMMARY OF THE INVENTION

Therefore, the objective of the present invention is to provide a fully automatic injection molding assembly which can control automatically and precisely the amount of molten foamable material to be injected into a mold unit and which can control automatically the opening of the mold unit.

Accordingly, an injection molding assembly for forming foam products comprises:

- a mold unit including a stationary mold board and a movable mold board which confine cooperatively a mold cavity, the movable mold board being formed with an inlet port to access the mold cavity, the mold unit being provided with a pressure sensor for detecting pressure inside the mold cavity;
- a mold opening mechanism connected to the stationary and movable mold boards and activable so as to open and close selectively the mold unit, the mold opening mechanism including a pressure cylinder disposed pivotally on one side of the mold unit and provided with a retractable shaft, and a pair of toggle arms, each of which having a first end connected pivotally to the shaft of the pressure cylinder and a second end connected pivotally to a respective one of the stationary and movable mold boards, the toggle arms being different in length;
- an injection molding machine disposed adjacent to the mold unit;
- a machine moving mechanism activable so as to move the injection molding machine selectively toward and away from the mold unit; and
- an automatic control unit connected to the pressure sensor, the pressure cylinder of the mold opening mechanism, the injection molding mechanism and the machine moving mechanism, the control unit normally activating the pressure cylinder to retract the retractable shaft so as to move the movable mold board toward the stationary mold board in order to close the mold unit, the control unit activating the machine moving mechanism to move the injection molding machine toward the mold unit and further activating the injection molding machine to inject molten foamable material into the mold cavity via the inlet port until the pressure inside the mold cavity reaches a first predetermined value to indicate that a predetermined amount of the molten foamable material has been fed thereto, the control unit activating the machine moving mechanism to move the injection molding machine away from the mold unit and further activating the pressure cylinder to extend the retractable shaft so as to move the movable mold board away from the stationary mold board in order to open the mold unit when the pressure inside the mold cavity reaches a second predetermined value to indicate that foaming of the molten foamable material in the mold cavity has been completed.

The injection molding assembly further comprises a closure mechanism which is provided on the movable mold board adjacent to the inlet port. The closure mechanism has a movable cover plate and is controlled by the control unit so as to move the cover plate in order to close the inlet port when the pressure inside the mold cavity reaches the first predetermined value, and so as to move the cover plate in order to open the inlet port when the pressure inside the mold cavity reaches the second predetermined value.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Before the present invention is described in greater detail, it should be noted that the various components were drawn in different scales to facilitate understanding of the preferred embodiment.

Figure 2:
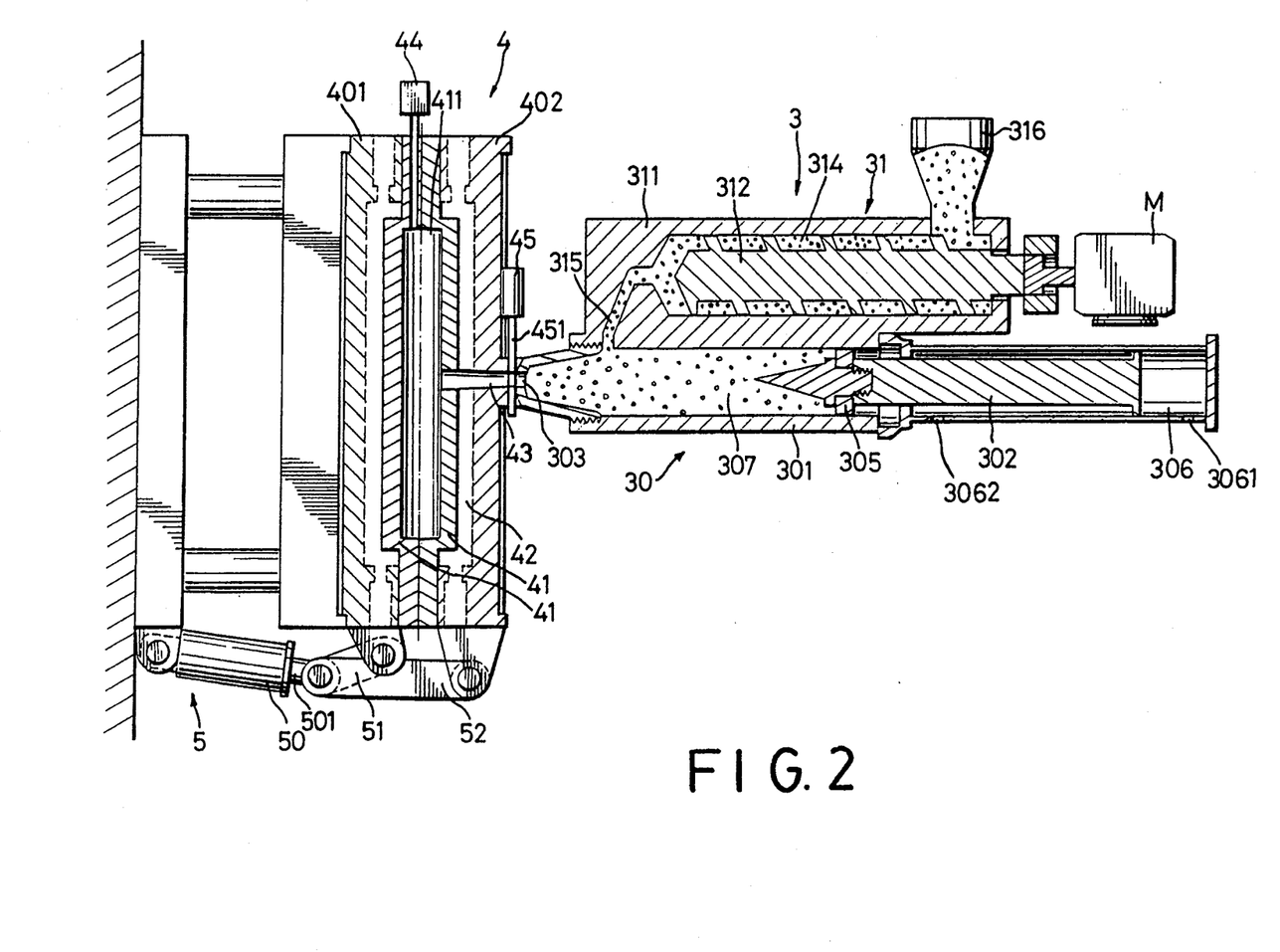
FIG. 2 is a schematic view of the preferred embodiment of a fully automatic injection molding assembly according to the present invention.
Figure 6:
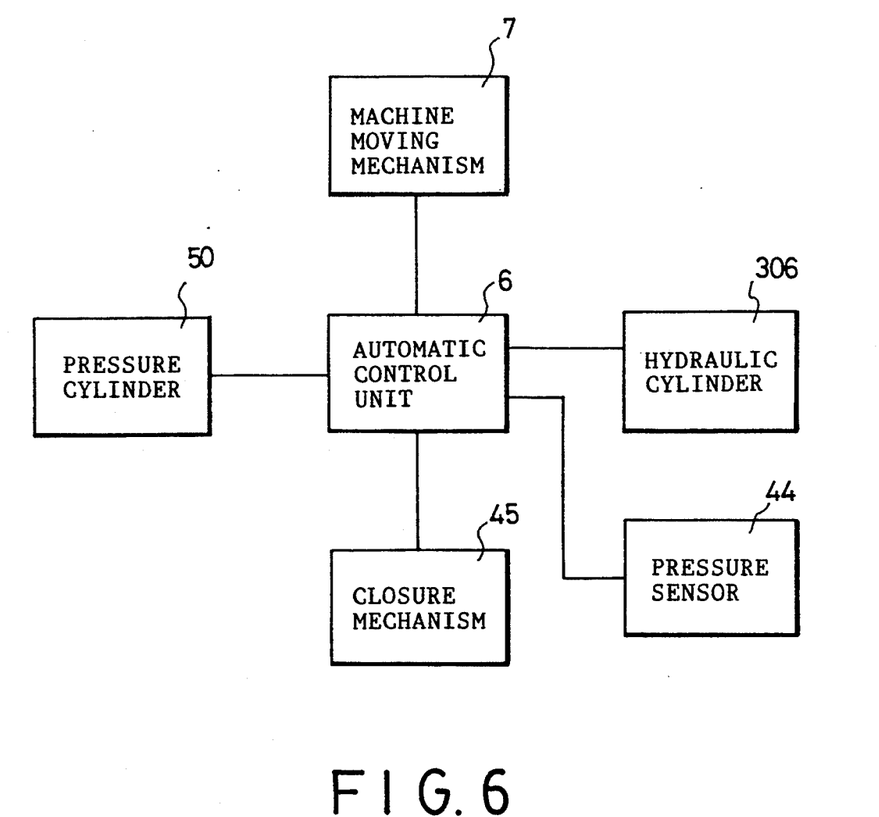
FIG. 6 is a schematic circuit block diagram of the circuit components of the preferred embodiment.

Referring to FIGS. 2 and 6, the preferred embodiment of an injection molding assembly according to the present invention is shown to comprise an injection molding machine 3, a mold unit 4, a mold opening mechanism 5, an automatic control unit 6, and a machine moving mechanism 7.

The injection molding machine 3 has a plunger section 30 and a reciprocating screw section 31. The plunger section 30 includes an injection cylinder 301, an injection plunger 302 extending into the injection cylinder 301 and a hydraulic cylinder 306 controlled by the control unit 6 so as to drive the injection plunger 302 movably and axially in the injection cylinder 301. The front end of the injection cylinder 301 is formed with a nozzle 303. The injection plunger 302 has a front end which is provided with a piston 305 that is in sliding contact with the inner wall surface of the injection cylinder 301. The injection cylinder 301 is provided with fluid ports 3061, 3062 to permit two-way axial movement of the injection plunger 302 in the injection cylinder 301. The injection cylinder 301 has a volume-variable injection chamber 307 between the piston 305 and the nozzle 303.

Figure 3:
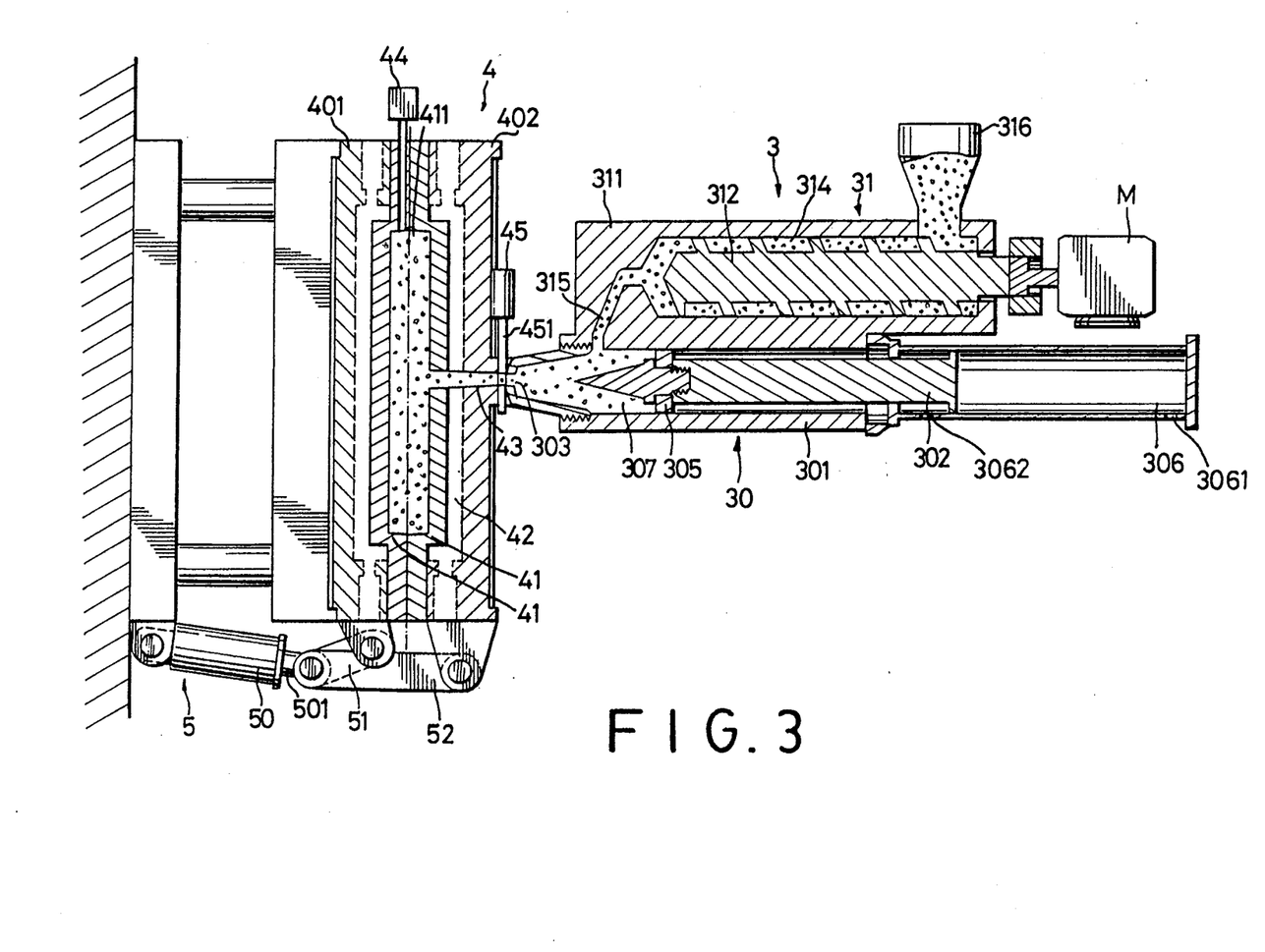
FIGS. 3 to 5 are schematic views illustrating the preferred embodiment during different operating stages.

The reciprocating screw section 31 includes a plasticizing cylinder 311, a reciprocating screw 312 which extends into a hollow space 314 confined by the plasticizing cylinder 311, and a motor unit (M) for driving rotatably the reciprocating screw 312. The reciprocating screw section 31 is disposed above the plunger section 30. The plasticizing cylinder 311 has a front end which is formed with a downwardly extending passage 315 that communicates the hollow space 314 with the injection chamber 307 of the injection cylinder 301. A material hopper 316 is provided on a rear end of the plasticizing cylinder 311 to feed raw foamable material into the hollow space 314 of the latter. The reciprocating screw 312 has an outer surface which is provided with heating elements (not shown). The reciprocating screw 312 is thus responsible for heating and homogenizing the foamable material in the plasticizing cylinder 311 and causes the foamable material to flow through the passage 315 and into the injection chamber 307 when rotated. When the injection chamber 307 already contains a predetermined amount of molten foamable material, the hydraulic cylinder 306 is activated by the control unit 6 to force the injection plunger 302 toward the nozzle 303, as shown in FIG. 3.

Note that, in the conventional injection molding assembly shown in FIG. 1, the molten foamable material flows into the injection chamber 21 of the injection cylinder 2 via the clearance 13. A bottleneck occurs at the clearance 13 because it is relatively small, thereby resulting in an increase in the temperature of the molten foamable material thereat. Because of the increase in temperature at the injection chamber 21, early foaming of the molten foamable material is likely to occur, thus resulting in the production of inferior quality products. In the injection molding machine 3 of the present invention, no bottleneck is created. Thus, an untimely increase in the temperature of the molten foamable material is prevented to prevent correspondingly early foaming of the molten foamable material.

The mold unit 4 includes stationary and movable mold boards 401, 402, each of which having an internal surface provided with a product mold 41 on a central portion. The product molds 41 of the mold boards 401, 402 confine cooperatively a mold cavity 411. Each of the mold boards 401, 402 is further provided with a passage 42 around the respective product mold 41 to permit the flow of a heating medium therethrough so as to maintain the temperature of the mold unit 4 at a desired level. Alternatively, heating elements (not shown) may be installed in the passages 42 to achieve the same result.

The movable mold board 402 has an inlet port 43 to access the mold cavity 411. The injection molding machine 3 is disposed adjacent to the mold unit 4 such that the nozzle 303 is aligned with the inlet port 43. Molten foamable material in the injection chamber 307 can thus be injected into the mold cavity 411 so as to commence foaming of the same in the mold unit 4. The mold unit 4 is further provided with a pressure sensor 44 that is connected to the control unit 6 and that is capable of detecting the pressure inside the mold cavity 411. The pressure sensor 44 may be an electrical pressure gauge which is capable of generating different electrical signals in response to the pressure inside the mold cavity 411, or a mechanical pressure gauge.

The movable mold board 402 is further provided with a closure mechanism 45 adjacent to the inlet port 43. The closure mechanism 45 has a movable cover plate 451 and is controlled by the control unit 6 in order to open and close selectively the inlet port 43 during the different operating stages of the injection molding assembly.

The mold opening mechanism 5 includes a pressure cylinder 50 and a pair of toggle arms 51, 52. The pressure cylinder 50 is disposed pivotally on one side of the mold unit 4 and has a retractable shaft 501. Each of the toggle arms 51, 52 has a first end connected pivotally to the shaft 501 of the pressure cylinder 50 and a second end connected pivotally to a bottom end of a respective one of the mold boards 401, 402.

Figure 7:
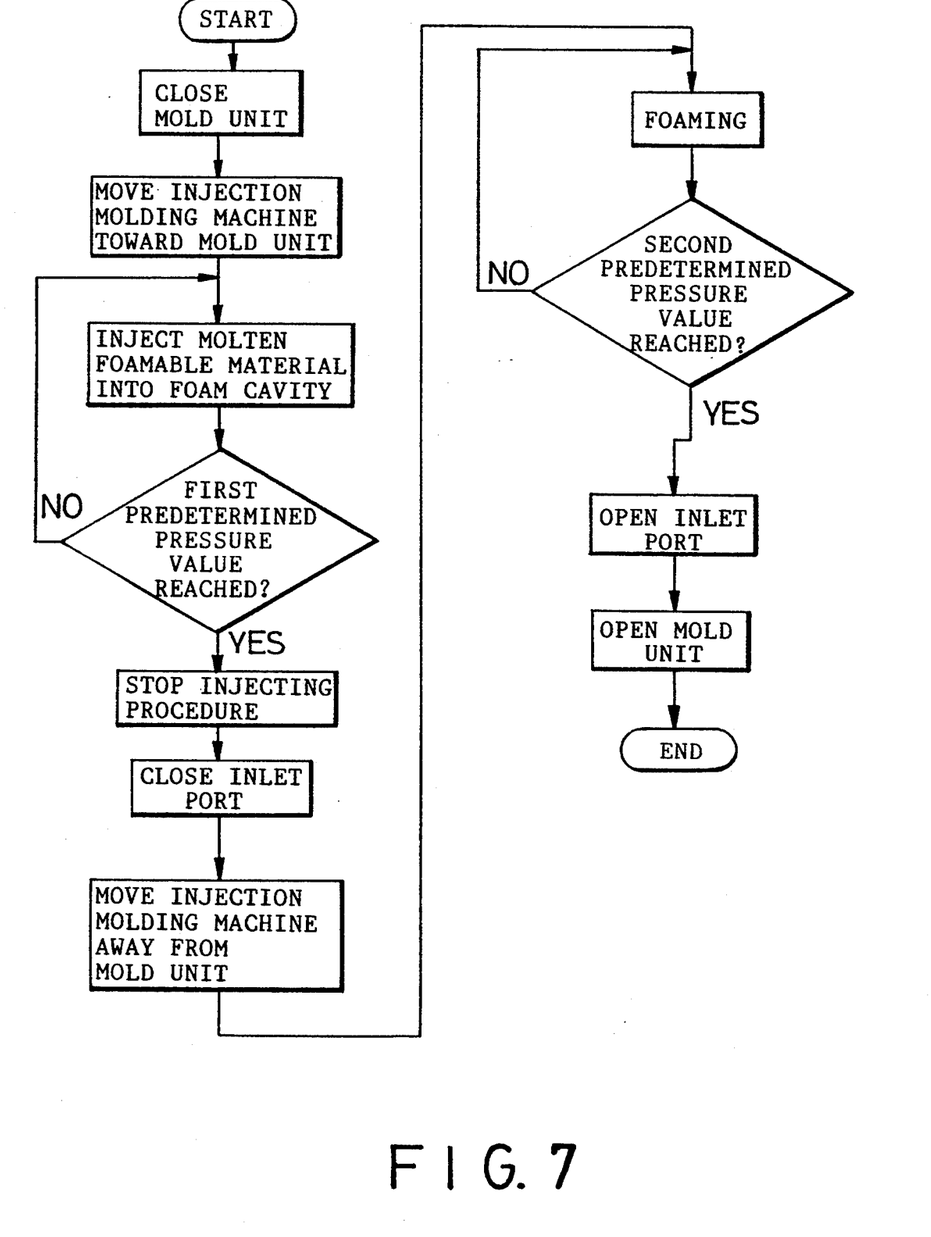
FIG. 7 is a flowchart which illustrates a molding operation to be performed by the preferred embodiment.

The operation of the preferred embodiment is described in greater detail in the succeeding paragraphs:

Referring to FIGS. 2 and 7, at the start of the operation of the injection molding assembly, the control unit 6 activates the pressure cylinder 50 to retract the retractable shaft 501, thereby moving the movable mold board 402 toward the stationary mold board 401 in order to close the mold unit 4. The control unit 6 then activates the machine moving mechanism 7 to move the injection molding machine 3 toward the mold unit 4 in order to dispose the nozzle 303 close to the inlet port 43. At this stage, the control unit 6 activates the hydraulic cylinder 306 to force the injection plunger 302 toward the nozzle 303, thereby causing the transfer of molten foamable material in the injection chamber 307 into the mold cavity 411, as shown in FIG. 3. Upon detection by the pressure sensor 44 that the pressure inside the mold cavity 411 has reached a first predetermined value to indicate that a predetermined amount of the molten foamable material has been fed thereto, the control unit 6 ceases to activate the hydraulic cylinder 306 and controls the closure mechanism 45 to move the cover plate 451 in order to close the inlet port 43. This illustrates how the amount of molten foamable material that is injected into the mold cavity 411 is controlled in the present invention.

Figure 4:
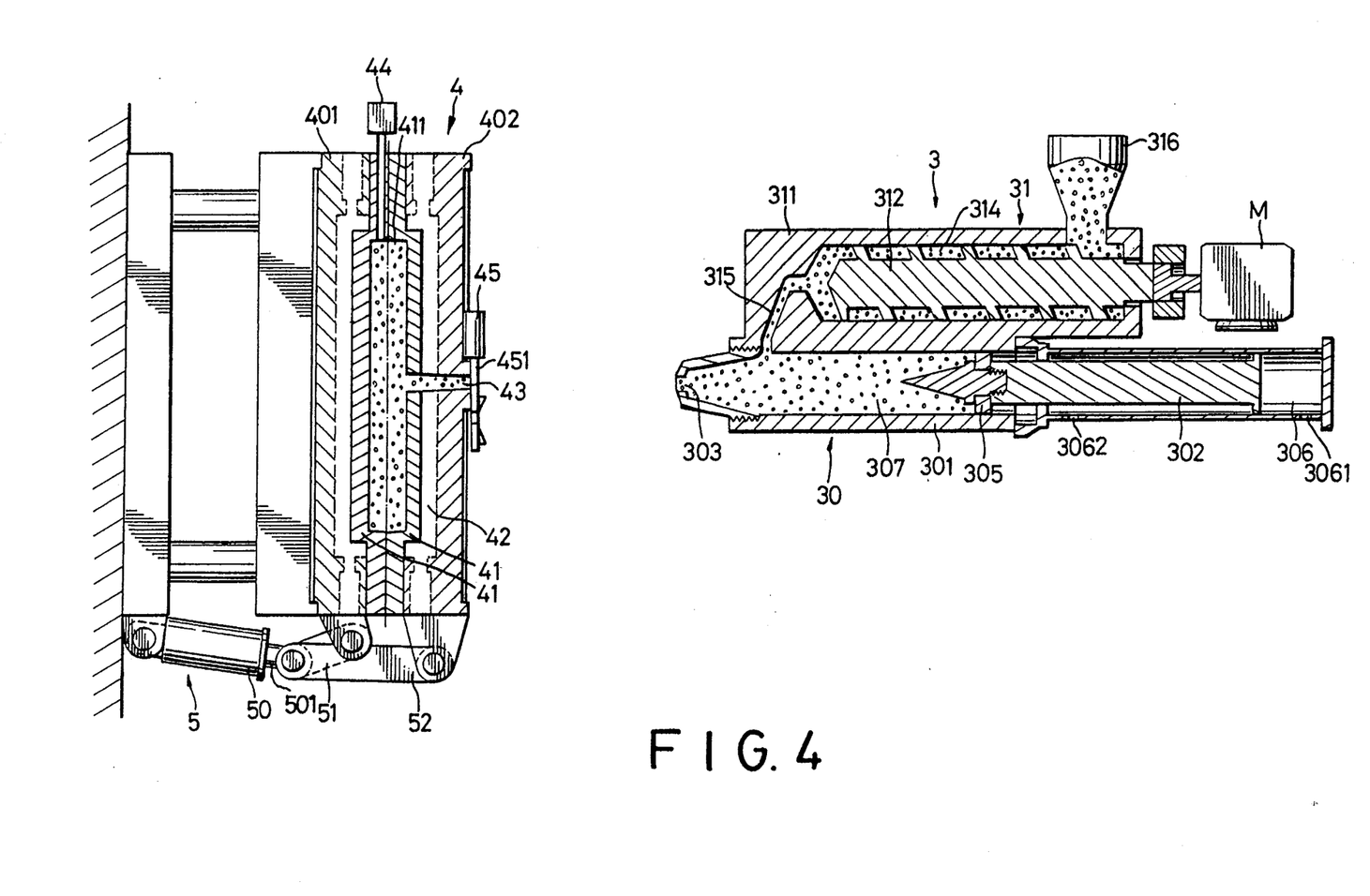

Referring to FIGS. 4 and 7, because the motor (M) causes continuous rotation of the reciprocating screw 312, molten foamable material continues to flow into the injection chamber 307, thereby pushing the injection plunger 302 away from the nozzle 303. In this embodiment, the control unit 6 activates the machine moving mechanism 7 to move the injection molding machine 3 away from the mold unit 4 while foaming of the molten foamable material is being accomplished. Alternatively, such a step may be done when foaming of the molten foamable material has been completed.

Figure 5:
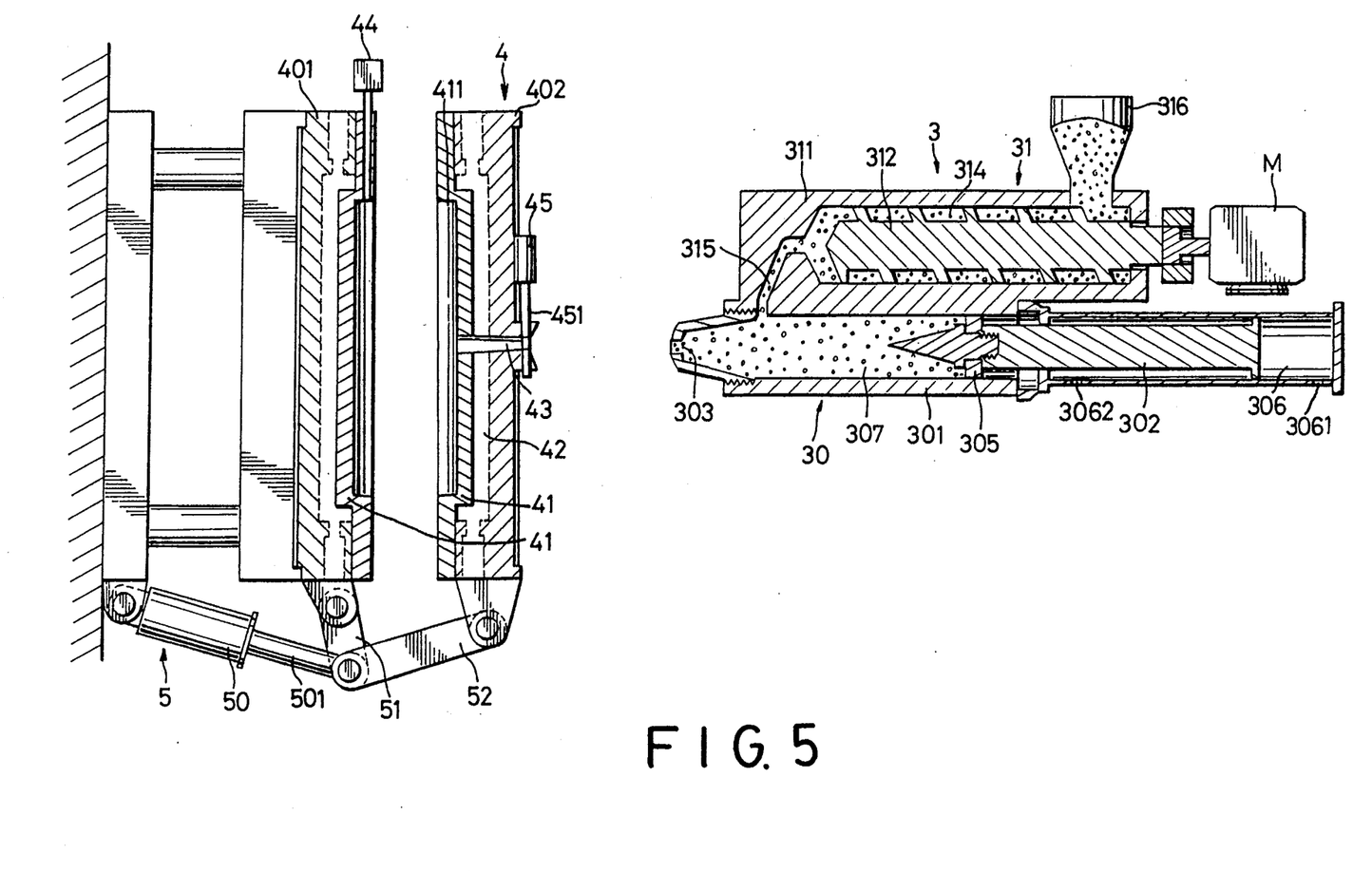

Referring to FIGS. 5 and 7, upon detection by the pressure sensor 44 that the pressure inside the mold cavity 411 has reached a second predetermined value to indicate that foaming of the molten foamable material in the mold cavity 411 has been completed, the control unit 6 controls the closure mechanism 45 to move the cover plate 451 in order to open the inlet port 43. The control unit 6 further activates the pressure cylinder 50 to extend the retractable shaft 501. Note that since the toggle arm 51 is shorter than the toggle arm 52, the toggle arms 51, 52 pivot at different angles when the retractable shaft 501 is extended, thereby causing movement of the movable mold board 402 away from the stationary mold board 401 so as to open the mold unit 4 and permit removal of the finished foam product.

Because minimum human intervention is required in the operation of the injection molding assembly of the present invention, the production capacity can be increased to decrease correspondingly the manufacturing costs while ensuring the production of high quality products.

Note that the product molds 41 can be used to produce a specific kind of foam product. When the present invention is in use, there is no need to replace the entire mold unit 4 when it is desired to manufacture another kind of product since the product molds 41 of the mold unit 4 are replaceable.

It is further noted that that the disclosed embodiment may be modified by incorporating a plurality of mold units disposed on a rotary base or by incorporating a plurality of mold units disposed on a conveyor mechanism. Such modifications can be easily accomplished by one who is skilled in the art and will not be detailed further.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An injection molding assembly for forming foam products, comprising:

a mold unit including a stationary mold board and a movable mold board which confine cooperatively a mold cavity, said movable mold board being formed with an inlet port to access said mold cavity, said mold unit being provided with a pressure sensor for detecting pressure inside said mold cavity;

a mold opening mechanism connected to said stationary and movable mold boards and activable so as to open and close selectively said mold unit;

an injection molding machine disposed adjacent to said mold unit;

a machine moving mechanism activable so as to move said injection molding machine selectively toward and away from said mold unit; and an automatic control unit connected to said pressure sensor, said mold opening mechanism, said injection molding mechanism and said machine moving mechanism, said control unit normally activating said mold opening mechanism to move said movable mold board toward said stationary mold board so as to close said mold unit, said control unit activating said machine moving mechanism to move said injection molding machine toward said mold unit and further activating said injection molding machine to inject molten foamable material into said mold cavity via said inlet port until the pressure inside said mold cavity reaches a first predetermined value to indicate that a predetermined amount of the molten foamable material has been fed thereto, said control unit activating said machine moving mechanism to move said injection molding machine away from said mold unit and further activating said mold opening mechanism to move said movable mold board away from said stationary mold board so as to open said mold unit when the pressure inside said mold cavity reaches a second predetermined value to indicate that foaming of the molten foamable material in said mold cavity has been completed.

2. The injection molding assembly as claimed in claim 1, further comprising a closure mechanism provided on said movable mold board adjacent to said inlet port, said closure mechanism having a movable cover plate and being controlled by said control unit so as to move said cover plate in order to close said inlet port when the pressure inside said mold cavity reaches the first predetermined value and so as to move said cover plate in order to open said inlet port when the pressure inside said mold cavity reaches the second predetermined value.

3. The injection molding assembly as claimed in claim 1, wherein said mold opening mechanism comprises:

a pressure cylinder disposed pivotally on one side of said mold unit and provided with a retractable shaft; and a pair of toggle arms, each of which having a first end connected pivotally to said shaft of said pressure cylinder and a second end connected pivotally to a respective one of said stationary and movable mold boards, said toggle arms being different in length; said pressure cylinder being connected to said control unit and being activated normally thereby so as to retract said retractable shaft to move said movable mold board toward said stationary mold board, said control unit activating said pressure cylinder so as to extend said retractable shaft to move said movable mold board away from said stationary mold board when the pressure inside said mold cavity reaches the second predetermined value.

* * * * *

UNITED STATES PATENT AND TRADEMARK OFFICE
CERTIFICATE OF CORRECTION

PATENT NO. : 5,447,425
DATED : September 5, 1995
INVENTOR(S) : Hsu et al.

It is certified that error appears in the above-indentified patent and that said Letters Patent is hereby corrected as shown below:

Title page item [75],

"Tao-Yuan Hsian" should read --Tao-Yuan Hsien--.

Signed and Sealed this

Fourth Day of February, 1997

Attest:

BRUCE LEHMAN

Attesting Officer

Commissioner of Patents and Trademarks